United States Patent [19]

Dornan

[11] Patent Number: 4,819,493
[45] Date of Patent: Apr. 11, 1989

[54] AUTOMOBILE ELECTRIC DOOR LOCK ACTUATOR

[75] Inventor: Arthur E. Dornan, Ypsilanti, Mich.

[73] Assignee: Kelsey-Hayes Co., Romulus, Mich.

[21] Appl. No.: 98,654

[22] Filed: Sep. 21, 1987

[51] Int. Cl.[4] .................. F16H 19/04; F16D 19/00
[52] U.S. Cl. .................................. 74/89.17; 74/405; 74/625; 192/103 C
[58] Field of Search ............... 192/103 C; 74/89.17, 74/405, 625

[56] References Cited

U.S. PATENT DOCUMENTS

| | | | |
|---|---|---|---|
| 2,262,330 | 11/1941 | MacNeil et al. | 192/103 C |
| 2,513,798 | 7/1950 | Hatfield | 192/103 C |
| 2,737,277 | 3/1956 | Kemna et al. | 192/103 C |
| 2,996,156 | 8/1961 | Czaja | 192/103 C |
| 4,616,527 | 10/1986 | Frey et al. | 74/625 |
| 4,706,512 | 11/1987 | McKernon et al. | 74/625 |

FOREIGN PATENT DOCUMENTS 52-24652  2/1977  Japan .................. 192/103 C

*Primary Examiner*—Leslie A. Braun
*Assistant Examiner*—Scott Anchell
*Attorney, Agent, or Firm*—Ralph J. Skinkiss; Paul J. Rose

[57] ABSTRACT

An electric door lock actuator includes an outer casing which houses a reversible electric motor. The motor is coupled to a inertial clutch assembly and a gear train to reciprocally move a rack which extends outwardly from the casing between an advanced and a retracted position. The clutch assembly includes a drive gear coupled to the electric motor, and driven gear connected to operate the rack through the gear train. The clutch also includes an inertially operated clutch plate eccentrically mounted on the clutch drive gear and having a pair of arcuately spaced driving teeth alternately operably engageable with the driven clutch gear when the motor is driven in either a forward or a reverse direction. The clutch is operative to connect the motor to either advance or retract the rack when the motor shaft is operated in either a forward or a reverse direction. When the motor is not operating, the clutch disconnects the motor shaft from the rack such that the rack can move between the advanced and retracted positions without rotating the motor shaft.

10 Claims, 5 Drawing Sheets

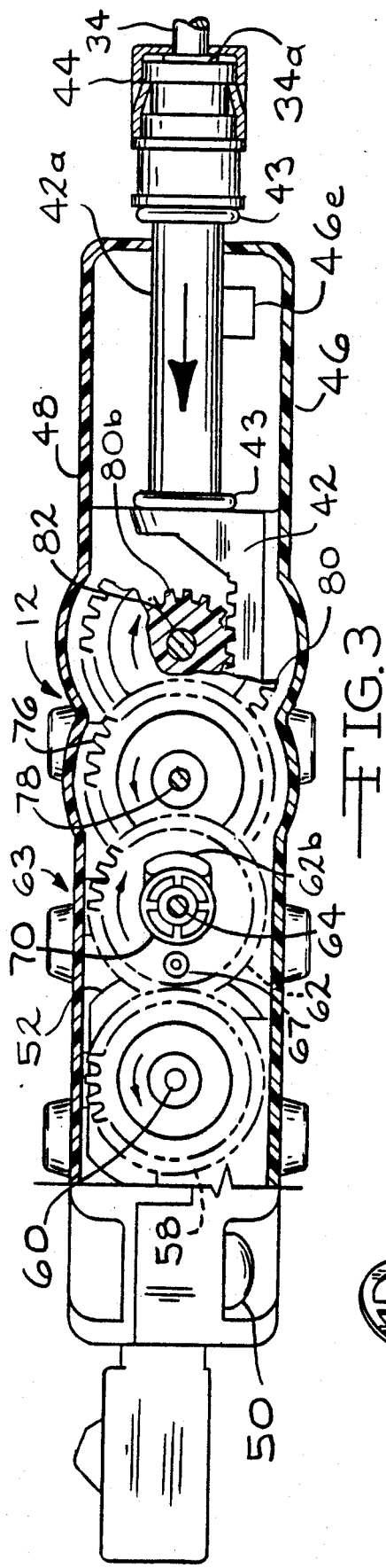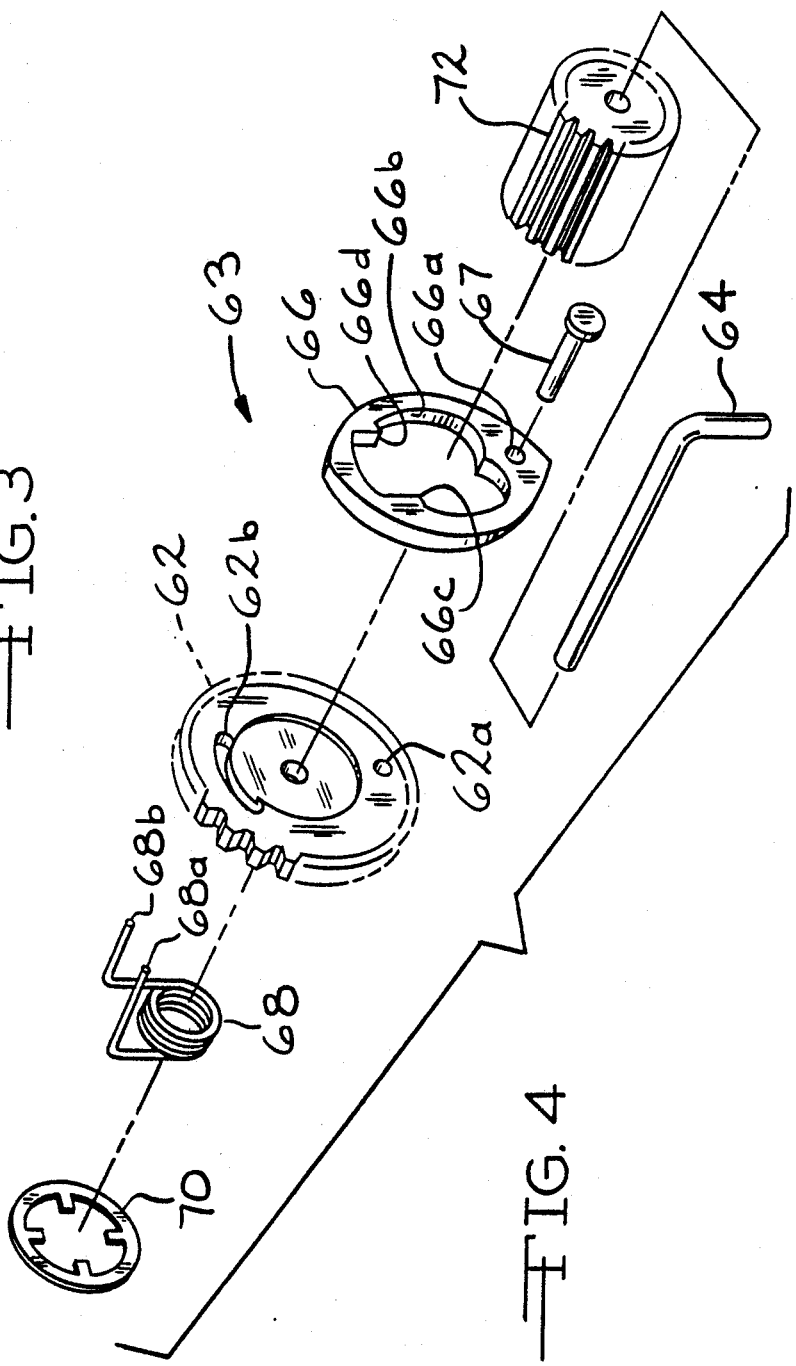

AUTOMOBILE ELECTRIC DOOR LOCK ACTUATOR

BACKGROUND OF THE INVENTION

This invention relates generally to an electrically-operated actuator for remotely operating a mechanical mechanism and, more particularly, to an improved compact actuator for operating an automobile door lock.

An electric door locking system typically includes a separate electric actuator which is located in each door housing and is provided with appropriate interconnecting linkage for moving an internal door latch assembly between locked and unlocked positions. The electric actuator can either be a solenoid-operated device, or a mechanism which is driven by an electric motor.

One of the problems encountered in incorporating the actuator in the door housing relates to the limited space which is typically available. In addition to an electric door lock actuator, automotive doors often include power window mechanisms and/or radio speakers. The problem of fitting an actuator within the door assembly becomes more difficult with smaller vehicles.

SUMMARY OF THE INVENTION

The present invention relates to an electric actuating mechanism which can be utilized as an electric door lock actuator. The actuator has a compact design, and thus can be easily incorporated and used in automotive doors having limited space.

The actuator includes an outer casing which houses a reversible electric motor. The motor is coupled to a inertial clutch assembly and a gear train to reciprocally move a rack which extends outwardly from the casing between an advanced and a retracted position.

The inertially operated clutch is operative to engage the motor with the gear train to either advance or retract the rack when the motor shaft is operated in either a forward or a reverse direction. When the motor is not operating, the clutch disconnects the motor shaft from the gear train such that the rack may be moved between the advanced and retracted positions without rotating the motor shaft.

The inertially operated clutch which is incorporated into the door lock actuating mechanism has a unique construction. The clutch includes a drive gear coupled to the electric motor, and a driven gear connected to operate the rack through the gear train. The clutch also includes an inertially operated clutch plate eccentrically mounted on the clutch drive gear and having a pair of arcuately spaced driving teeth alternately engageable with the driven clutch gear when the motor is driven in either a forward or reverse direction.

The above, as well as other advantages of the present invention, will become readily apparent to one skilled in the art from reading the following detailed description of the invention in conjunction with the attached drawings.

BRIEF DESCRIPTION OF THE DRAWINGS

FIG. 3 is a side elevational view of the door lock actuator as shown in FIG. 2, partly in section and taken generally along the line 3—3 of FIG. 2 including the protective cover;

FIG. 4 is an exploded perspective view of the clutch assembly of the door lock actuator of FIGS. 1–3;

DESCRIPTION OF THE PREFERRED EMBODIMENT

Description

Figure 1:
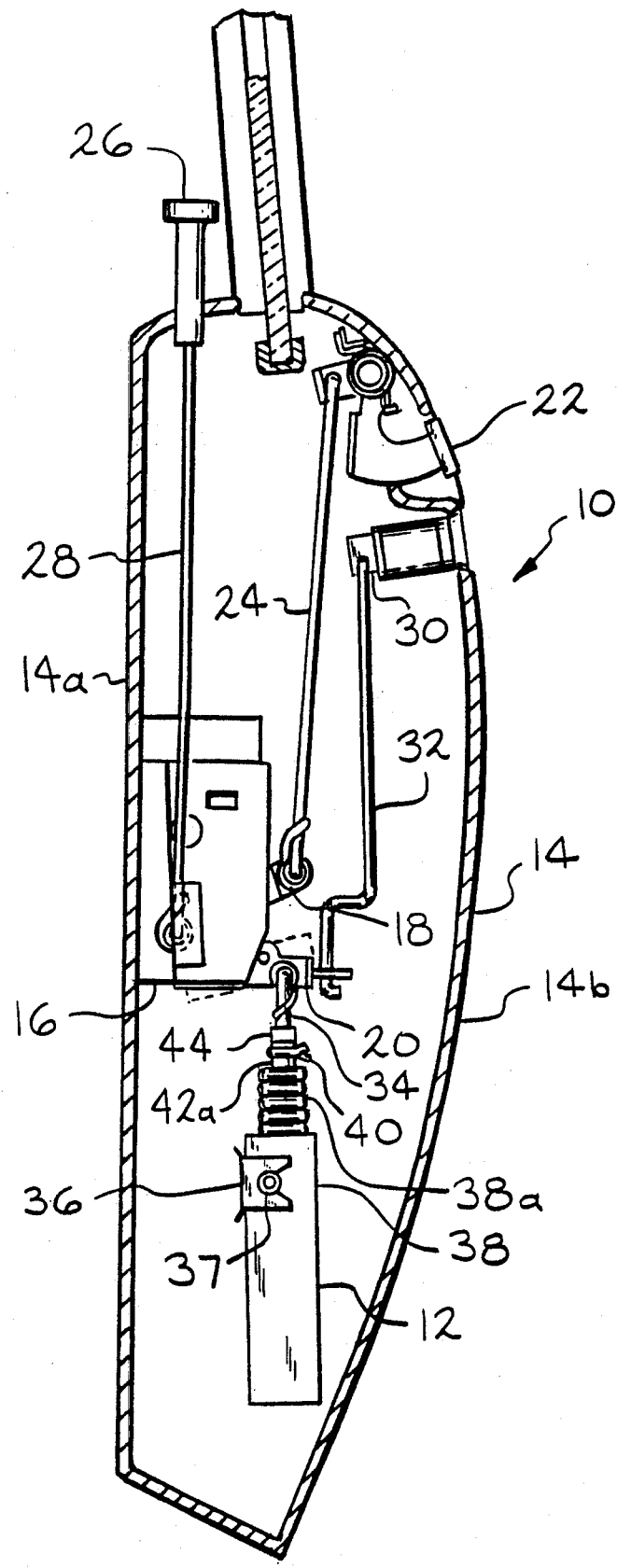
FIG. 1 is a vertical sectional view of an automobile door having a door lock actuator therein constructed in accordance with the invention.

With reference to the drawings, FIG. 1 shows a typical automobile door 10 having a door lock actuator 12 constructed in accordance with the present invention mounted therein. While the compact structure of the actuator 12 is particularly suitable for use in relatively thin doors of smaller cars, it can also perform adequately in doors of larger cars, or can be used for remotely operating mechanical mechanisms other than automobile door locks. Except for actuator 12 all other components shown in FIG. 1 are conventional, including the door latch, which is not shown, but, typically, consists of a V-notched plate pivotable into and out of latching relationship with a stationary pin on the car frame.

As shown in FIG. 1, the door 10 includes a hollow metal enclosure 14 including an inner panel 14a and an outer panel 14b. A frame 16 for the latching and locking mechanism is typically mounted on the inner side of inner panel 14a and accommodates a pivotally mounted latching lever 18 and a pivotally mounted locking lever 20. The locking lever 20 as shown is in the "unlocked" position and the broken lines indicate the "locked" position. An outside handle 22, accessible from outside the door 10, is pivotally mounted on the inner side of outer panel 14b and is operatively connected to the latching lever 18 by a rod 24. When the locking lever 20 is in the unlocked position, handle 22 can be operated to open door 10. Also, an inside handle (not shown) is operatively connected to the latching lever 18. Conversely, when the locking lever 20 is in the locked position, it interferes with movement of the latching lever 18 and neither the inside handle nor the outside handle 22 can be operated to open the door 10.

The locking lever 20 is typically movable between the locked and unlocked positions by any of one of three actuating means which include an inside push-pull button 26 operatively connected thereto by rod 28, an outside key-operated lock cylinder 30 operatively connected thereto by rod 32, and by rod 34 operatively connected to and forming a part of the actuator 12.

A bracket 36 provided with grommets 37 is suitably mounted in the enclosure 14 and pivotally supports actuator 12, which is typically protected against infiltration of water from above by a rubber skirt 38. The skirt 38 is clamped by clamp 40 to the cylindrical extension 42a (FIGS. 2 and 3) of a rack 42 of actuator 12. An upper portion 38a of skirt 38 is pleated to accommodate the stroke of rack 42. One end 34a of actuator rod 34 is received in an elongate recess 41 in rack extension 42a and is secured to rack extension 42a by retaining cap 44 and O-rings 47 and 49, as best shown in FIG. 2.

Figure 2:
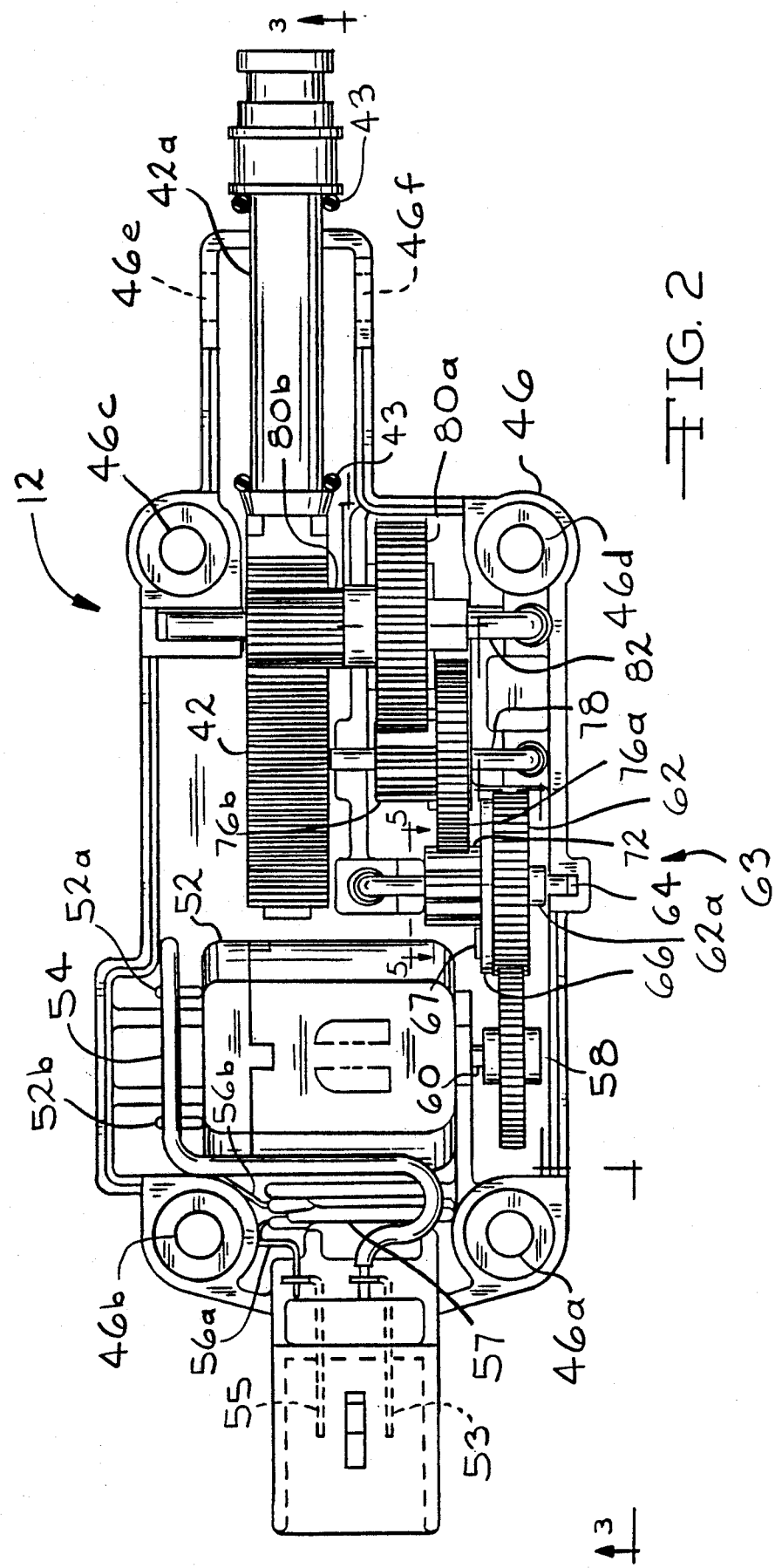
FIG. 2 is a plan view of the door lock actuator of FIG. 1 with the protective cover removed.

With reference to FIGS. 2 and 3, actuator 12 has a casing including a base 46 and a cover 48 typically held together by any suitable fasteners 50. The fasteners 50 project respectively through holes 46a, 46b, 46c and 46d (FIG. 2) in base 46. The cover 48 also has a snap-in connection to base 46, provided by a pair of prongs (not shown) having tapered lugs which snap respectively into a pair of rectangular holes 46e and 46f provided respectively in side walls of the base 46.

An electrically reversible motor 52 is mounted in base 46 as shown in FIG. 2. One terminal 52a of the motor is electrically connected to a plug-in terminal 53 by wire 54. A second terminal 52b of the motor is electrically connected to a plug-in terminal 55 by a pair of electrical conductors 56a and 56b having a circuit interrupter 57 connected therebetween. When energized, motor 52 rotates drive gear 58 fixedly mounted on output shaft 60 thereof. Drive gear 58 operatively engages clutch drive gear 62 forming a part of a clutch assembly 63 rotatably mounted on shaft 64 affixed to base 46.

As illustrated in FIGS. 4, 5, 8 and 9, an eccentrically mounted clutch plate 66 is pivotally mounted upon clutch pin 67 extending through aperture 66a in plate 66 and fixedly secured in aperture 62a of clutch drive gear 62. Clutch pin 67 is parallel to the axial portion of shaft 64. Clutch drive gear 62 includes an arcuate slot 62b for receiving therein the arcuately spaced straight end portions, 68a and 68b, of torsion coil spring 68. Spring 68 is retained in position on hub 62c on the opposite side of clutch drive gear by push-on fastener 70. The end portions 68a and 68b of torsion coil spring extend parallel to the axial portion of shaft 64 and through slot 62b of clutch drive gear 62 and into opening 66b of clutch plate 66.

A driven clutch gear 72 is rotatably mounted on the axial leg of shaft 64 adjacent the clutch drive gear 62 and on the same side thereof as clutch plate 66. Gear 72 extends through opening 66b of clutch plate 66. The opening 66b includes a pair of spaced driving teeth 66c and 66d alternatively engageable with the driven clutch gear 72, as explained hereinafter.

Operation

Figure 5:
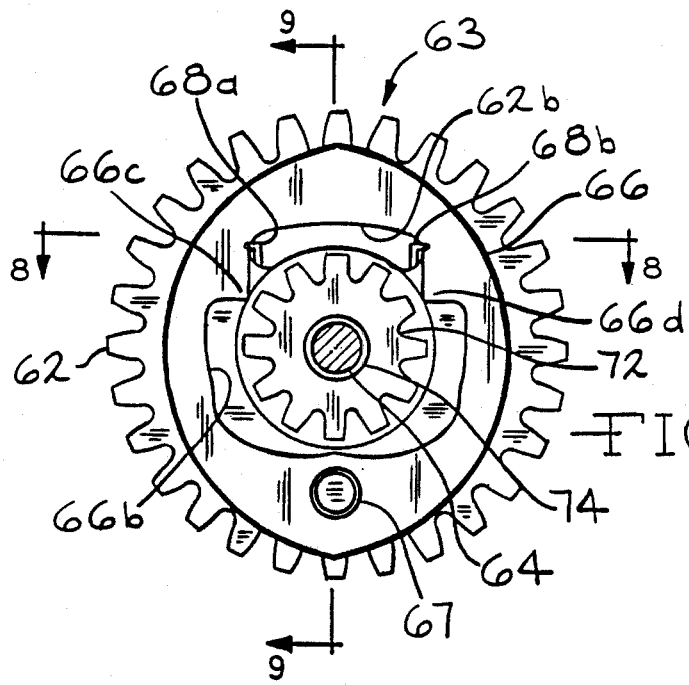
FIG. 5 is an elevational view of the clutch assembly of FIGS. 2–4, partly in section taken generally along the line 5—5 of FIG. 2, and showing the clutch-disengaged or neutral condition.
Figure 6:
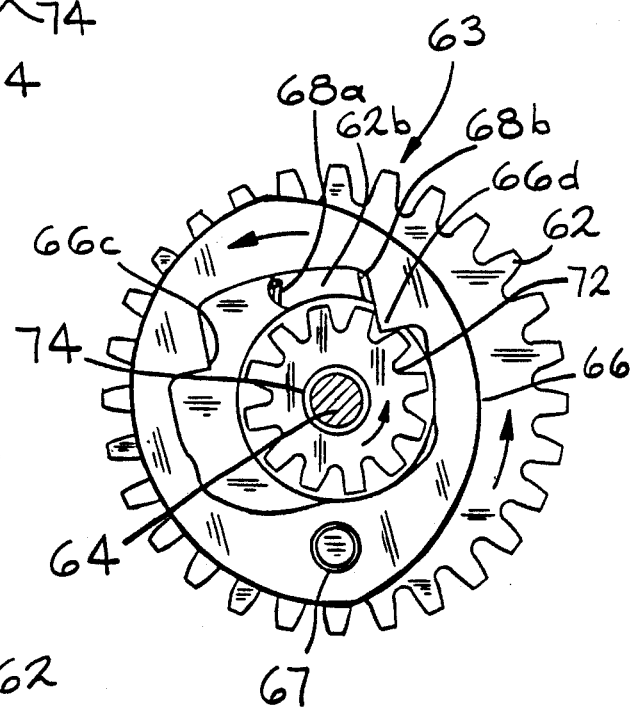
FIG. 6 is a view similar to FIG. 5, showing the clutch assembly engaged for moving a door lock to the locked position.
Figure 7:
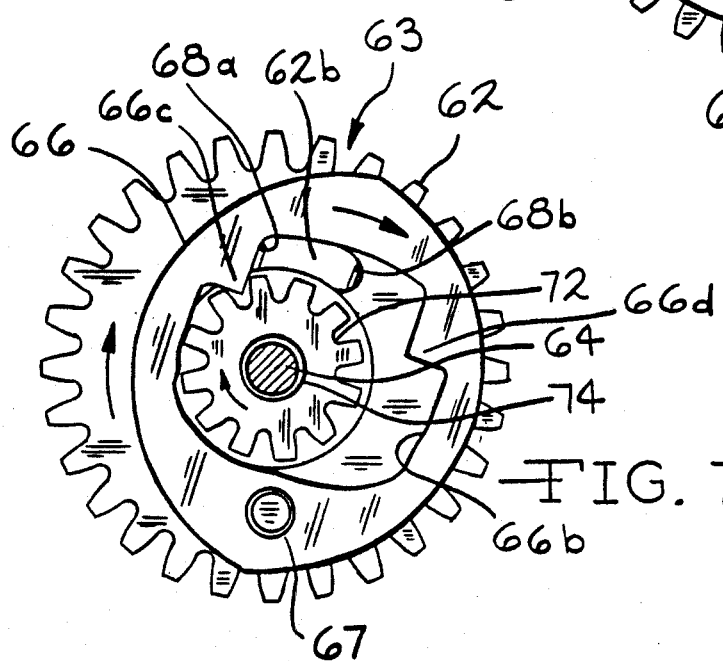
FIG. 7 is a view similar to FIGS. 5 and 6, but showing the clutch assembly engaged for moving a door lock to an unlocked position.
Figure 8:
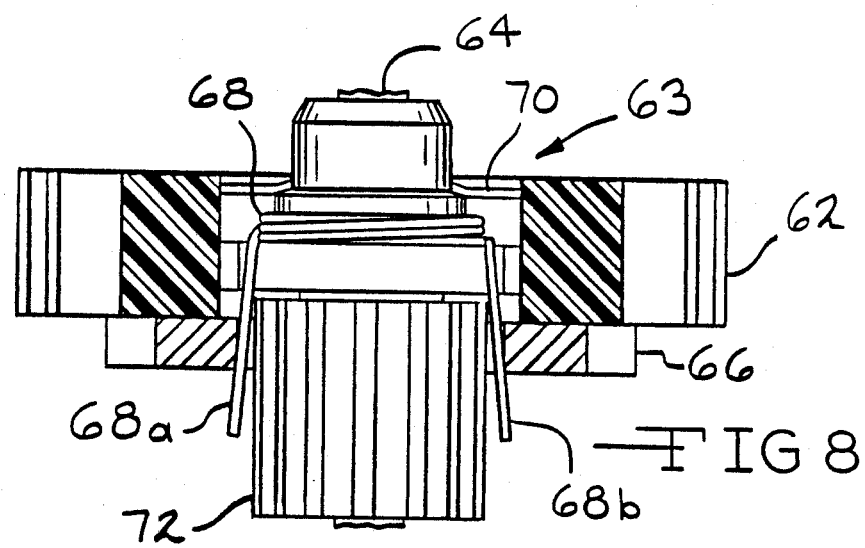
FIG. 8 is a sectional view of the clutch assembly taken generally along the line 8—8 of FIG. 5.
Figure 9:
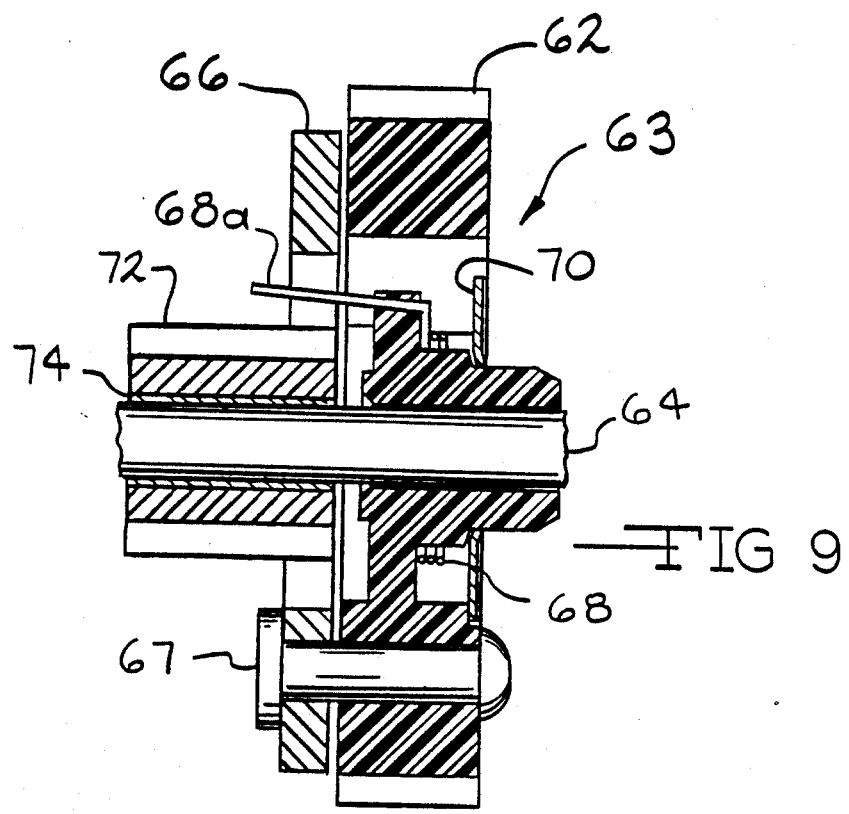
FIG. 9 is a sectional view of the clutch assembly taken generally along the line 9—9 of FIG. 5.

With reference to FIGS. 5-7, the clutch assembly 63 is shown in FIG. 5 in a neutral or clutch-disengaged position which occurs whenever motor 52 is de-energized. In this position, torsion spring ends 68a and 68b center clutch plate 66 upon clutch drive gear 62 so that neither of the driving teeth 66c or 66d engages clutch gear 72.

FIG. 6 shows the clutch assembly 63 in the lock apply mode which occurs when motor 52 and motor drive gear 58 accelerate clockwise as viewed in FIG. 3 thereby causing clutch assembly 63 as viewed in FIG. 6 to also accelerate clockwise. Again as viewed in FIG. 6 clutch plate 66, due to its own inertia, undergoes less clockwise acceleration than does clutch drive gear 62 so that clutch plate 66 rotates counterclockwise relative to clutch drive gear 62 about clutch pin 67. The inertia of clutch plate 66 overcomes the force of torsion coil spring 68 and thus continues to rotate counterclockwise relative to clutch drive gear 62 until driving tooth 66 engages driven clutch gear 72 and thereby imparts clockwise rotation to driven clutch gear 72. FIG. 6 illustrates a highly preferred configuration of clutch assembly 63 in that the reaction force or resistance to rotation of driven clutch gear 72 exerts a counterclockwise torque as seen in FIG. 6 on clutch plate 66 during the locking mode of actuator 12. This counterclockwise torque aids in maintaining driving tooth 66d in positive engagement with driven clutch gear 72 to insure that driving tooth 66d does not ratchet along the tooth crowns of driven clutch gear 72 whereby proper operation of clutch assembly 63 is assured and the life of clutch assembly 62 is prolonged by reducing wear on driving tooth 66d and clutch gear 72.

Upon stoppage of driven clutch gear 72 as when lever 20 reaches its locked position, motor 52 also stops because of the engagement of driving tooth 66d with clutch gear 72, whereupon electrical power to motor 52 is cut off either by the vehicle user turning a key in lock cylinder 30 or by circuit interrupter 57 which operates automatically after door lock actuator 12 reaches the locked position. Thereafter torsion coil sprint 68 effects disengagement of clutch plate 66 from driven clutch gear 72 and rotation of clutch plate 66 to the neutral position shown in FIG. 5.

As shown in FIGS. 2 and 3, gear 72 operatively engages gear 76a of double gear 76 rotatably mounted on shaft 78 secured in base 46. Gear 76b of double gear 76 operatively engages gear 80a of double gear 80 rotatably mounted on shaft 82 secured in base 46. Gear 80b of double gear 80 operatively engages rack 42. Thus clockwise rotation of motor shaft 60 and motor drive gear 58 (as viewed in FIG. 3) causes translation of rack 42 and the attached actuator rod 34 to the right thereby locking the door lock mechanism. Similarly counterclockwise rotation of motor shaft 60 and motor drive gear 58 (as viewed in FIG. 3) effects unlocking of the door lock mechanism.

FIG. 7 shows clutch assembly 63 in a clutch-engaged condition which occurs when the motor shaft 60 and motor drive gear 58 are rotated to unlock the door lock mechanism. This configuration of clutch assembly 63 results from the counterclockwise angular acceleration of clutch assembly 63 wherein clutch plate 66, due to its own inertia, undergoes less counterclockwise acceleration than does clutch drive gear 62 so that clutch plate 66 rotates clockwise relative to clutch drive gear 62 about clutch pin 67. The inertia of clutch plate 66 overcomes the force of torsion coil spring 68 and thus continues to rotate clockwise relative to clutch drive gear 62 until driving tooth 66d engages driven clutch gear 72 and thereby imparts counterclockwise rotation to driven clutch gear 72. The reaction force of driven clutch gear 72 creates a clockwise torque on clutch plate 62 which aids in maintaining constant engagement of clutch plate 62 with driven clutch gear 72.

In the preferred embodiment the cylindrical portion 42a of rack 42 is provided with a pair of elastomeric O-rings 43 for absorbing shock should the end of the retraction and extension stroke of rack 42 ever be reached. However in most anticipated applications, lever 20 (FIG. 1) is expected to reach the locked and unlocked position prior to rack 42 reaching the end of its extension or retraction stroke respectively. To protect rack 42 and the gear train, additional shock absorbing O-rings 47 and 49 are provided on rod 34, either side of collar 45 and within retaining cap 44. Thus any impact shock transferred to rod 34 by lever 20 during the extension or retraction stroke of rack 42 is thereby absorbed by O-rings 49 and 47 respectively.

By the present invention a compact door lock actuator is provided which readily fits within the thin door of a small, compact car. The actuator is also relatively light in weight, being made largely of plastic parts. The motor 52 is a relatively high-speed, low-torque motor and thus requires the mechanical advantage afforded by the larger gears or gear portions 62, 76a, and 80a driving smaller gears or gear portions 72, 76b, and 80b. When it is desired to lock or unlock a door 10 manually, however, as by a key inserted in the lock cylinder 30 or by operation of the push-pull button 26, the mechanical advantage afforded the motor 52 becomes a mechanical disadvantage, since the larger gears or gear portions are then driven manually by operation of the smaller gears or gear portions. The clutch assembly 63 thus enables manual locking or unlocking of the automobile door 10 without rotation of the motor 52, its shaft 60, the drive gear 58, and the clutch drive gear 62 with its clutch plate 66 and torsion coil spring 68. Therefore, in the actuator 12, manual operation starts with movement of the rack 42 and terminates in free rotation of the driven clutch gear 72.

Various modifications may be made in the structure shown and described without departing from the spirit and scope of the invention as set forth in the following claims.

What is claimed is:

1. An automobile door lock actuator comprising:
   a casing;
   a reversible electric motor mounted in said casing adjacent one end thereof, said motor having an output shaft;
   a rack reciprocably mounted in said casing, said rack having an extension projecting outwardly from said casing and being movable alternately to extended and retracted positions with respect to said casing, said rack adapted to be coupled to operate the door lock;
   a motor drive gear fixedly secured on said output shaft for rotation therewith;
   a clutch assembly in said casing and coupled to be driven by said motor drive gear, said clutch assembly including
      a first mounting shaft mounted in the casing,
      a clutch drive gear rotatably mounted on said first mounting shaft and operatively engaged with said motor drive gear, said clutch drive gear having a pin mounting hole disposed eccentrically of said first mounting shaft and an arcuate slot therethrough diametrically opposite said pin mounting hole,
      a pin mounted on said clutch drive gear in said pin mounting hole,
      a clutch plate pivotally mounted on said pin on one side of said clutch drive gear, said clutch plate having an opening therethrough defining a pair of arcuately spaced driving teeth,
      a driven clutch gear rotatably mounted on said first mounting shaft on said one side of said clutch drive gear, said driven clutch gear having an end portion disposed in said opening in said clutch plate for operative engagement alternately with said driving teeth, and
      a torsion coil spring mounted on said clutch drive gear on an opposite side thereof from said clutch plate and having a pair of arcuately spaced straight end portions extending through said arcuate slot in said clutch drive gear and into said opening in said clutch plate respectively adjacent said driving teeth, said spring normally biasing said clutch plate toward a neutral position wherein neither of said driving teeth is operatively engaged with said driven clutch gear;
   gear means for operatively connecting said driven clutch gear to said rack for reciprocating said rack along a linear path.

2. An actuator as defined in claim 1 wherein said gear means includes a second shaft mounted in the casing; a first double gear rotatably mounted on said second mounting shaft and including a larger gear portion operatively engaged with said driven clutch gear and a smaller gear portion; a third mounting shaft mounted in the casing; a second double gear rotatably mounted on said third mounting shaft and including a larger gear portion operatively engaged with the smaller gear portion of said first double gear, said second double gear also having a smaller gear portion; and said smaller portion of said second double gear operatively engages said rack.

3. An actuator as defined in claim 2 wherein each of said first, second, and third mounting shafts is generally L-shaped and said casing includes a base and a cover, a short leg portion of each of said L-shaped shafts being anchored in said base and a free end portion of a long leg portion of each of said L-shaped shafts being clamped to or held in said base by said cover.

4. An actuator as defined in claim 1 wherein said one end of the casing is provided with a pair of plug-in terminals electrically connected to said motor.

5. An actuator as defined in claim 1 including a circuit interrupter for interrupting an electric power supply to said motor after said rack extension reaches its extended or retracted position.

6. An electric actuator for operating a mechanical mechanism comprising:
   a reciprocably mounted rack adapted to be coupled to operate the mechanical mechanism;
   a reversible electric motor;
   clutch means for selectively connecting said motor to said rack for reciprocating said rack;
   said clutch means including a rotatably mounted clutch drive gear coupled to be driven by said motor having an arcuate slot therethrough, a clutch plate eccentrically mounted on one side of said clutch drive gear for pivotal movement with respect thereto due to rotational inertia of said clutch plate during angular acceleration of said clutch drive gear, said clutch plate having an opening therethrough defining a pair of arcuately spaced driving teeth, a rotatably mounted driven clutch gear coupled to drive said rack and disposed on said one side of said clutch drive gear and having an end portion disposed in said opening in said clutch plate for operative engagement alternately with said driving teeth, and a torsion coil spring mounted on said clutch drive gear on an opposite side thereof from said clutch plate and operably engaging said clutch plate through said arcuate slot in said clutch drive gear to maintain said clutch plate in a neutral position wherein neither of said driving teeth engages said driven clutch gear when said motor is de-energized.

7. An electric actuator for operating a mechanical mechanism comprising:

a reciprocably mounted rack adapted to be coupled to operate the mechanical mechanism;

a reversible electric motor having an output shaft; and gear means operatively connecting said motor output shaft to said rack for reciprocating said rack, said gear means including an inertially engaged clutch for selectively driving said rack in either an advancing or retracting direction when said motor output shaft is operated in a forward or reverse direction respectively, and spring means for disengaging said clutch when said motor is not operating to permit reciprocal movement of said rack without causing rotation of said motor output shaft.

8. A clutch assembly comprising:

a mounting shaft;

a clutch drive gear rotatably mounted on said shaft and having a pin mounting hole disposed eccentrically of said shaft and an arcuate slot therethrough diametrically opposite said pin mounting hole;

a pin mounted on said clutch drive gear in said pin mounting hole;

a clutch plate pivotally mounted on said pin on one side of said clutch drive gear, said clutch plate having an opening therethrough defining a pair of arcuately spaced driving teeth;

a driven clutch gear rotatably mounted on said shaft on said one side of said clutch drive gear, said driven clutch gear having an end portion disposed in said opening in said clutch plate for operative engagement alternately with said driving teeth; and a torsion coil spring mounted on said clutch drive gear on an opposite side thereof from said clutch plate and having a pair of arcuately spaced straight end portions extending through said arcuate slot in said clutch drive gear and into said opening in said clutch plate respectively adjacent said driving teeth, said spring normally biasing said clutch plate toward a neutral position wherein neither of said driving teeth is operatively engaged with said driven clutch gear.

9. A clutch assembly as defined in claim 8 wherein said torsion coil spring is mounted on a hub portion of said clutch drive gear and held thereon by a push-on fastener.

10. A clutch assembly comprising:

a mounting shaft;

a clutch drive gear rotatably mounted on said shaft;

a clutch plate eccentrically mounted on said clutch drive gear on one side thereof and having an opening therethrough defining a pair of spaced-apart driving teeth;

a driven clutch gear rotatably mounted on said shaft on said one side of said clutch drive gear, said driven clutch gear having an end portion disposed in said opening in said clutch plate for operative engagement alternately with said driving teeth; and biasing means operatively associated with said clutch plate for normally biasing said clutch plate to a neutral position wherein neither of said driving teeth is operatively engaged with said driven clutch gear.

* * * * *